Jan. 15, 1946.  J. C. TARBELL ET AL  2,393,203
BEARING
Filed March 27, 1943
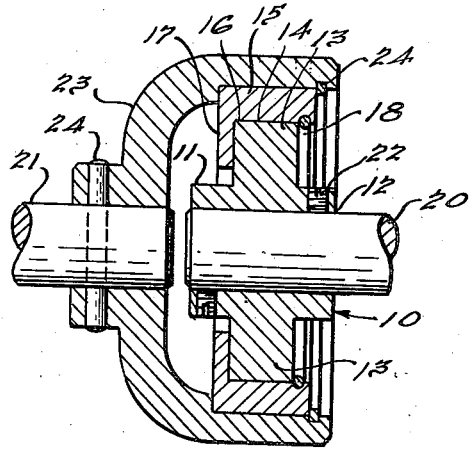
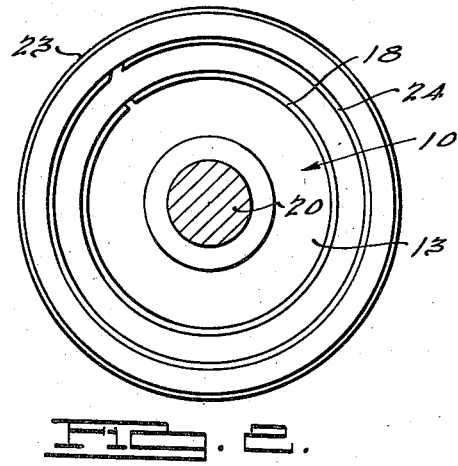
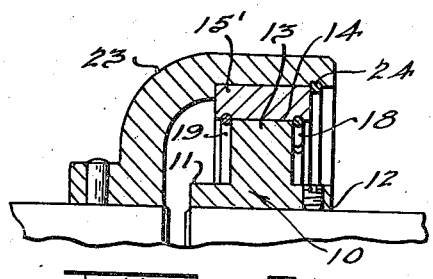
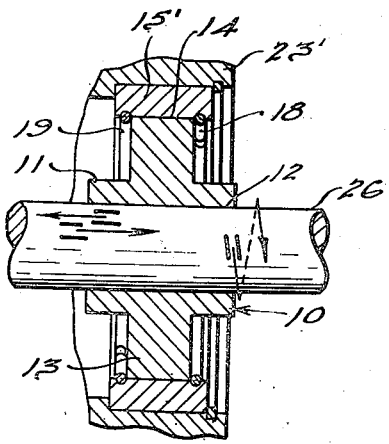
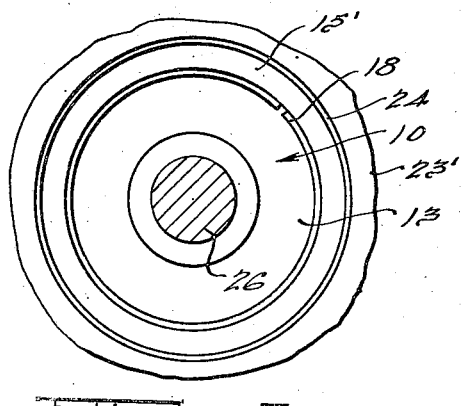
INVENTORS.
John C. Tarbell,
John H. Conant.
BY
Harness, Dickey, Pierce & Harris
ATTORNEYS.

Patented Jan. 15, 1946

2,393,203

UNITED STATES PATENT OFFICE 2,393,203

BEARING

John C. Tarbell, Springfield, and John H. Conant, Holyoke, Mass.

Application March 27, 1943, Serial No. 480,752

6 Claims. (Cl. 308—121)

This invention relates to an improved bearing construction.

An object of the invention is to provide a bearing construction characterized by its simplicity of design, economy of manufacture and relatively high degree of strength. More particularly the invention has for its object the provision of a bearing construction including a lubricant absorbed porous metal structure embodying the foregoing features together with a support therefor, the support and porous metal structure having cooperating bearing surfaces to which the lubricant absorbed content of the porous metal structure is exuded.

Another object of the invention is the provision of a bearing construction including a porous metal structure and a support therefor detachably maintained in assembled position by means so associated with the porous metal structure as to prevent scoring thereof incident to relative rotation of the support and porous metal structure.

A further object of the invention is the provision of a bearing having the foregoing characteristics which is adapted for use in those places where a more expensive ball bearing has been used.

A still further object of the invention is the provision of a bearing of the foregoing type which can be incorporated in a coupling between relatively rotatable parts.

Other objects of the invention will be more apparent from the following description taken in connection with the accompanying drawing, in which:

Fig. 1 is a sectional elevational view of a shaft coupling including the improved bearing construction.

Fig. 2 is an end elevation of the Fig. 1 coupling.

Fig. 3 is a view similar to Fig. 1 but showing a modified form of retainer for the bearing members.

Fig. 4 is an axial section through a bearing construction embodying the invention.

Fig. 5 is an end elevation of the Fig. 4 bearing construction.

The bearing construction includes a lubricant impregnated porous metal member, generally indicated by the numeral 10, having a main body 11 provided with a central shaft receiving bore 12, and an annular radially outwardly extending part 13. The part 13 has an axial dimension less than that of the main body 11 and has a bearing surface 14 at the radially outer periphery thereof to which lubricant contained within the member 10 is adapted to be exuded.

The member 10 can be formed by a mixture of powdered metals, for example 88.5% copper, 10% tin and 1.5% solid lubricant such as graphite, exfoliate mica or powdered boric acid. The mixture is briquetted to the desired shape and sintered in a furnace having a non-oxidizing atmosphere at a temperature below the melting point of copper and above the melting point of tin. The particles of the mixture are thus bonded together to form a rigid structure having voids or pores throughout capable of absorbing a substantial quantity of lubricant. The rigid structure is then immersed in a suitable acid bath to lubricant-impregnate the same.

Associated with the member 10 is a support 15 encompassing the latter and having a bearing surface 16 on the inner periphery thereof so engaging the bearing surface 14 as to accommodate relative rotation between the parts 10 and 15. The support 15 has an axial dimension greater than the corresponding dimension of the part 13 of the member 10 and in the embodiment of Figs. 1 and 2 is provided with an integral inwardly extending annular flange 17 overlapping and engaging the adjacent side face of the part 13 for retaining the member 10 against axial movement in one direction relative to the support 15. A snap ring 18 is detachably seated in a groove in the inner periphery of the support 15 and engaged with the part 13 cooperates with the flange 17 to detachably position the member 10 with respect to its support 15. In Figs 3, 4 and 5 the support member 15' does not include the flange 17 and the function of the latter is performed by a snap ring 19 arranged with respect to the parts 10 and 15 as set forth in connection with the ring 18.

It will be noted that the retaining means in each instance is rotatable with the support 15 and engages a portion of the member 10 to which the lubricant content of the latter is exuded, thus preventing scoring incident to relative rotation of the parts 10 and 15.

Referring to Figs. 1, 2 and 3, the improved bearing is illustrated in its application to a coupling for coaxial shafts 20 and 21. The porous metal member 10 is non-rotatably secured to the shaft 20 by a plurality of set screws, one of which is shown at 22 and the support 15 is shown as inserted in an annular housing 23 non-rotatably secured to the shaft 21 by a pin 24. The housing 23 is formed with a portion of reduced section providing a shoulder against which the support 15 abuts and an annular groove in which is detachably received a snap ring 24. The support 15 has a press fit within the housing 23 for rotation therewith, relative rotation between the shafts 20, 21 being accommodated at the surfaces 14, 16.

The foregoing construction can be employed for example when it is desirable to shift the shaft 20, during rotation thereof, in a direction longitudinally of its rotative axis by similarly manipulating the shaft 21, the shaft 20 being suitably associated with a mechanism (not shown) adapted to be controlled by the aforesaid axial movement of shaft 20.

Referring to Figs. 4 and 5, a shaft 26 is journalled in the central bore of the member 10 and the latter is adapted for rotation relative to the support 15', it being understood that the support 15 may be used in this embodiment if desired. The support 15' is adapted to a housing or casing 23' in the manner set forth in connection with Fig. 1. In this form of the invention the lubricant contained by the member 10 is exuded to the inner and outer bearing surfaces.

Although but two embodiments of the invention are herein shown and described, it will be understood that various changes in the size, shape and arrangement of parts may be made without departing from the spirit of our invention and it is not our intention to limit said invention other than by the terms of the appended claims.

We claim:

1. A bearing construction comprising a lubricant impregnated porous metal member having a central shaft receiving bore and a peripheral bearing surface to which the lubricant contained within said member is adapted to be exuded, a support for said member having a bearing surface engaging said peripheral bearing surface for relative rotation therebetween, said support including a flange engaging a radially disposed face of said member for retaining the latter against axial movement in one direction relative to said support, and a snap ring carried by said support and engaged with said member for retaining the latter against axial movement in another direction relative to said support.

2. A bearing construction comprising a lubricant impregnated member including a central body provided with a shaft-receiving bore and an integral annular radially outwardly extending part having an axial dimension less than that of said body and having a peripheral bearing surface at the radial extremity thereof to which lubricant contained within said member is adapted to be exuded, a support for said member having a face thereof concentric with and constituting a bearing surface engaged with the member bearing surface for relative rotation therebetween, portions of the support face projecting axially beyond said part in opposite directions, and snap rings respectively detachably engaged with said axially projecting portions of said face for rotation therewith and acting against said part for retaining said member against axial displacement relative to said support.

3. A unitary bearing assembly comprising a lubricant impregnated porous metal inner member including a central shaft receiving bore and an integral radially outwardly extending part having surfaces to which the lubricant content of the member is adapted to be exuded, including axially opposite side surfaces and an intermediate peripheral bearing surface concentric with the bore, an outer member having a bearing surface engaging said peripheral bearing surface for relative rotation therebetween and having portions thereof respectively projecting beyond the bearing surface of the inner member in opposite directions, and spaced means non-rotatably carried by said outer member and respectively engaging a side face of said part for retaining said inner member against axial displacement relative to said outer member, at least one of said means being a snap ring engaged with one of said axially projecting portions.

4. In a coupling for relatively rotatable shafts and the like, a lubricant impregnated porous metal member including a central body having a bore receiving one of said shafts and an annular part extending radially outwardly from said central body having a bearing surface at the radial periphery thereof to which lubricant is adapted to be exuded, said central body having bore-forming portions thereof extending axially beyond respective opposite extremities of said annular part such that the axial dimension of the bore is greater than the axial dimension of said bearing surface, means engaged with at least one of said portions and said one shaft for non-rotatably connecting said member to said one shaft, a second member non-rotatably secured to the other of said shafts and having a face thereof constituting a bearing surface engaging the first mentioned bearing surface for accommodating relative rotation of said shafts, and spaced means rotatable with said second member and engaging said annular part for retaining said members against relative axial displacement while accommodating said relative rotation therebetween, at least one of said spaced means including a snap ring engaged with said face of said second member adjacent the bearing surface thereof and an end face of said part.

5. In a coupling for relatively rotatable shafts and the like, a lubricant impregnated porous metal member including a central body having a bore receiving one of said shafts and an annular part extending radially outwardly from said central body having a bearing surface at the radial periphery thereof to which lubricant is adapted to be exuded, said central body having bore-forming portions thereof extending axially beyond respective opposite extremities of said annular section such that the axial dimension of the bore is greater than the axial dimension of said bearing surface, means engaged with at least one of said portions and said one shaft for non-rotatably connecting said member to said one shaft, a second member non-rotatably secured to the other of said shafts and having a face thereof constituting a bearing surface engaging the first mentioned bearing surface for accommodating relative rotation of said shafts, and means rotatable with said second member and engaging said annular part for retaining said members against relative axial displacement while accommodating said relative rotation therebetween, said means including a radially inwardly extending flange integral with said second member and engaging an end face of said annular part and a snap ring engaging said face of said second member and the end face of said part opposite said first mentioned end face.

6. In a coupling for relatively rotatable shafts and the like, a lubricant impregnated porous metal member including a central body having a bore receiving one of said shafts and an annular part extending radially outwardly from said central body having a bearing surface at the radial periphery thereof to which lubricant is adapted to be exuded, said central body having bore-forming portions thereof extending axially beyond respective opposite extremities of said annular section such that the axial dimension of the bore is greater than the axial dimension of said bearing surface, means engaged with at least one of said portions and said one shaft for non-rotatably connecting said member to said one shaft, a second member non-rotatably secured to the other of said shafts having a face thereof constituting a bearing surface engaging the first mentioned bearing surface for accommodating relative rotation of said shafts, said face of said second member having a plurality of spaced grooves therein, and a snap ring seated in each of said grooves and engaging a side face of said annular part retaining said members against relative axial displacement while accommodating said relative rotation.

JOHN C. TARBELL.
JOHN H. CONANT.